UNITED STATES PATENT OFFICE.

CHRISTOPHER RIS AND CHARLES SIMON, OF BASLE, SWITZERLAND, ASSIGNORS TO JOHN R. GEIGY & CO., OF SAME PLACE.

GRAY DYE AND PROCESS OF MAKING SAME.

SPECIFICATION forming part of Letters Patent No. 556,164, dated March 10, 1896.

Application filed January 2, 1896. Serial No. 574,121. (Specimens.)

*To all whom it may concern:*

Be it known that we, CHRISTOPHER RIS and CHARLES SIMON, citizens of the Swiss Confederation, residing in Basle, in the Republic of Switzerland, have invented certain new and useful Improvements in Processes for the Production of Gray Coloring-Matter, of which the following is a specification.

This invention relates to an improved process of making a gray coloring-matter; and it consists, first, of the process of producing the new coloring-matter by subjecting the alkyl derivative of beta-amido-alpha$_4$ naphtol-beta$_3$ sulfoacid to the action of a tetrazo compound, and, secondly, of the new gray coloring-matter having the characteristics hereinafter described.

We have discovered by a series of experiments that the alkyl derivative of the beta-amido-alpha$_4$ naphtol-beta$_3$ sulfoacid, when combined with tetrazodiphenyl or tetrazoditolyl, or with the products obtained by an intermediate combination of these tetrazo compounds with an amidonaphtol mono or disulfo acid furnishes new coloring-matter which is distinguished by an extraordinary fastness to the different influences to which dyed goods may be exposed. This fastness is considered better than that of other directly-dyeing gray coloring-matters.

The alkylated beta-amido-alpha$_4$ naphtol-beta$_3$ sulfoacid itself is a new substance, the production of which we have realized in two ways: first, by heating in an autoclave beta-naphtoldisulfoacid G with alkylamine to a temperature of about 250° centigrade, and then melting the resulting dimethyl-beta-naphtylamine-disulfoacid with caustic alkalies at a temperature above 200° centigrade; secondly, by the alkylation of gamma-amido-naphtol-sulfoacid.

The following example may explain the production of the coloring-matter: The tetrazo compound obtained from 18.4 kilograms of benzidine is poured into an alkaline solution of 26.7 kilograms of alkyl-beta-amido-alpha$_4$ naphtol-beta$_3$ sulfoacid. After standing for several hours the gray coloring-matter is filtered off and dried.

Instead of the tetrazo compound obtained from 18.4 kilograms of benzidine the intermediate compound of benzidine with, for instance, 31.9 kilograms of amidonaphtol-disulfoacid H may be used. Then only 13.35 kilograms of alkyl-beta-amido-alpha$_4$ naphtol-beta$_3$ sulfoacid are necessary for the reaction.

The gray coloring-matter consists of a dark-gray powder, is soluble in water with a bluish-gray color, soluble in concentrated sulfuric acid with a blue color, and producing upon unmordanted cotton bluish-gray to black shades.

Having thus described our invention, we claim as new and desire to secure by Letters Patent—

1. The process herein described of producing a gray coloring-matter, which consists in subjecting the alkyl derivative of beta-amido-alpha$_4$ naphtol-beta$_3$ sulfoacid to the action of a tetrazo compound, substantially as set forth.

2. The gray coloring-matter obtained by the action of a tetrazo compound upon an alkaline solution of alkyl-beta-amido-alpha$_4$ naphtol-beta$_3$ sulfoacid, and having the property of being soluble in water with a bluish-gray color, soluble in concentrated sulfuric acid with a blue color and producing on unmordanted cotton bluish-gray to black shades of considerable fastness, substantially as set forth.

In testimony that we claim the foregoing as our invention we have signed our names in presence of two subscribing witnesses.

CHRISTOPHER RIS.
CHARLES SIMON.

Witnesses:
GEORGE GIFFORD,
J. C. HAEHELIN.